United States Patent
Wadey

[11] Patent Number: 6,139,423
[45] Date of Patent: Oct. 31, 2000

[54] NOISE REDUCING BLEED AIR HEAT EJECTION DEVICE FOR A HEATING SYSTEM

[75] Inventor: Bryan T. Wadey, Woodbridge, Conn.

[73] Assignee: Sikorsky Aircraft Corporation, Stratford, Conn.

[21] Appl. No.: 09/312,045

[22] Filed: May 14, 1999

[51] Int. Cl.$^7$ .................................................. B60H 1/00
[52] U.S. Cl. ............................ 454/142; 454/71; 454/76
[58] Field of Search .............................. 454/76, 71, 142, 454/906; 181/224, 225

[56] References Cited

U.S. PATENT DOCUMENTS

| | | | |
|---|---|---|---|
| 2,277,982 | 3/1942 | Hosbein | 454/368 |
| 3,125,286 | 3/1964 | Sanders | 454/142 |
| 3,511,336 | 5/1970 | Rink et al. | 454/142 |
| 4,978,064 | 12/1990 | Steiner | 237/12.3 A |
| 5,114,382 | 5/1992 | Steiner | 454/76 |
| 5,196,653 | 3/1993 | Kiss | 454/142 |
| 5,197,921 | 3/1993 | De Lank et al. | 454/254 |

*Primary Examiner*—Pamela Wilson
*Assistant Examiner*—Derek S. Boles

*Attorney, Agent, or Firm*—Seidel, Gonda, Lavorgna & Monaco, PC

[57] ABSTRACT

A heat ejection device is disclosed for a heating system. The heat ejection device is adapted to mix ambient air from an interior with bleed air from a heat source. The heat ejection device includes a housing with an inner passage, an inlet and an outlet. The inlet is adapted to channel ambient air into the housing. The outlet is adapted to channel mixed heated and ambient air out of the housing. A dispenser is located in the housing between the housing inlet and outlet and includes an inner chamber which is adapted to receive heated air from a bleed line. The dispenser has a plurality of apertures formed in it which permit air to flow from the inner chamber into the inner passage for mixing with ambient air to form a flow of mixed air. An acoustically absorptive inlet liner is mounted on an inner surface of the housing at the housing inlet. The absorptive inlet liner is adapted to direct ambient air past the dispenser to minimize turbulence and absorb noise. An acoustically absorptive outlet liner is mounted on the inner surface of the housing downstream from the dispenser. The absorptive outlet liner is adapted to absorb noise generated within the heat ejection device caused by the mixing of the ambient and bleed air flows. A heating system incorporating the device is also disclosed.

22 Claims, 5 Drawing Sheets

NOISE REDUCING BLEED AIR HEAT EJECTION DEVICE FOR A HEATING SYSTEM

TECHNICAL FIELD

The present invention relates to an apparatus and system for reducing noise in an aircraft interior and, more particularly, to an improved bleed air heat ejection device which includes a noise reducing liner.

BACKGROUND OF THE INVENTION

Noise is one of the main complaints from aircraft passengers. especially passengers on helicopter aircraft. Many attempts have recently been made to reduce noise in both the cabin and cockpit interiors. Some attempts have centered around adding absorptive materials around the cabin interior to prevent noise from the airframe from propagating into the cabin. Other attempts have been directed toward reducing vibration of various aircraft components since vibration is one of the primary causes of noise within the aircraft.

One source of interior noise is produced by the heating system. In particular, many conventional aircraft utilize a cabin heat system that is mounted outboard of the interior trim panels, or otherwise encased from the interior, and which channels bleed air from the compressor stage of the turbine engine. The bleed air is generally at about 450° Fahrenheit and approximately 2–10 psi. This hot air is mixed in a mixing device with a flow of ambient air from the interior.

FIG. 1 is a graphical depiction of a prior art bleed air heat ejection cylinder which is commonly used to mix ambient air with hot bleed air. Air Comm of Boulder, Colorado manufactures one type of conventional bleed air heat ejection cylinder. The heater includes a cylindrical housing H which has an inlet end $H_I$ and an outlet end $H_o$. Bleed air is fed to a perforated ring R that is mounted within the housing. The flow of bleed air draws ambient aircraft interior air into and through the housing, thus functioning as an air pump. The ambient air is drawn in through the inlet and passes through the ring. After the ambient air passes through the ring, it mixes with the hot bleed air. The combined flow is then channeled out of the housing and back into the cabin or cockpit. U.S. Pat. Nos. 4,978,064, 5,165,597, and 5,114,382 disclose some conventional bleed air heat ejection cylinder systems.

One of the primary deficiencies with this type of conventional system is that the inflowing hot bleed air tends to generate noise as it expands into the cylinder. The mixing action of the hot bleed air and cool ambient air flows also generates noise, similar to noise generated by the exhaust of a jet engine. The noise bounces off the walls of the housing and propagates into the aircraft interior.

The noise generated by heating systems in aircraft can be quite loud. reaching as high as 130 dBA, and results in passenger and aircrew discomfort. High noise levels also interfere with passenger and aircrew communication.

One attempt at solving this problem of heating system related noise has been by the incorporation of a uniform thickness foam liner F downstream from the perforated ring. While this solution has provided some noise reduction, the amount of noise generated by such a heat ejection cylinder is still substantial, particularly in the quieter executive configured aircraft interiors.

A need, therefore, exists for an improved heating system for aircraft that reduces the noise that occurs during mixing of hot bleed air with ambient cabin or cockpit air.

SUMMARY OF THE INVENTION

An object of the invention is to provide a heat ejection device which reduces noise generated during mixing of cooler ambient air and hot bleed air.

Another object of the invention is to provide a heating system that incorporates a heat ejection device to reduce noise generated during mixing of ambient and bleed air.

Another object of the invention is to improve the airflow through the heating system to improve the mixing action of the hot engine bleed air and the cooler ambient interior air, thereby assuring that the heated air exiting the heating system is not excessively hot.

These and other objects and advantages are provided by a heat ejection device and heating system according to the present invention. The heating system includes a bleed line for channeling heated air from a heat source such as a turbine engine. The system also includes an inlet duct for channeling a flow of ambient air from a cabin interior, and an outlet duct for channeling mixed ambient and heated air to the cabin interior.

The heat ejection device includes a housing with an inlet and an outlet. The inlet is adapted to be attached to an inlet duct for channeling ambient air into the housing. The outlet is adapted to be attached to an outlet duct for channeling mixed heated and ambient air out of the housing. The housing defines an inner passage for air flow.

A dispenser is located within the housing between the housing inlet and outlet. The dispenser includes an inner chamber which is adapted to receive heated air from a bleed line. The dispenser has a plurality of apertures formed in it which permit air to flow from the inner chamber into the inner passage to mix with ambient air.

An acoustically absorptive inlet liner is mounted on an inner surface of the housing at the housing inlet. The absorptive inlet liner is adapted to direct ambient air past the dispenser to minimize turbulence and absorb noise.

An acoustically absorptive outlet liner is mounted on the inner surface of the housing downstream from the dispenser. The absorptive outlet liner is adapted to absorb noise generated within the heat ejection device caused by the mixing of the ambient and bleed air flows.

In one embodiment of the invention, the heat ejection device is a heat ejection cylinder with a substantially cylindrical housing.

In another embodiment of the invention, an acoustically absorptive body is mounted within the inner passage substantially along a longitudinal axis of the inner passage. The absorptive body is adapted to accelerate inflowing ambient air to reduce noise caused by the mixing of the hot bleed air and cooler slower moving ambient air flows.

The foregoing and other features and advantages of the present invention will become more apparent in light of the following detailed description of the preferred embodiments thereof, as illustrated in the accompanying figures. As will be realized, the invention is capable of modifications in various respects, all without departing from the invention. Accordingly, the drawings and the description are to be regarded as illustrative in nature, and not as restrictive.

BRIEF DESCRIPTION OF THE DRAWINGS

For the purpose of illustrating the invention the drawings show a form of the invention which is presently preferred. However, it should be understood that this invention is not limited to the precise arrangements and instrumentalities shown in the drawings.

DETAILED DESCRIPTION OF THE PREFERRED EMBODIMENTS

While the invention will be described in connection with one or more preferred embodiments, it will be understood that it is not intended to limit the invention to those embodiments. On the contrary, it is intended that the invention cover all alternatives, modifications and equivalents as may be included within its spirit and scope as defined by the appended claims.

Figure 1:
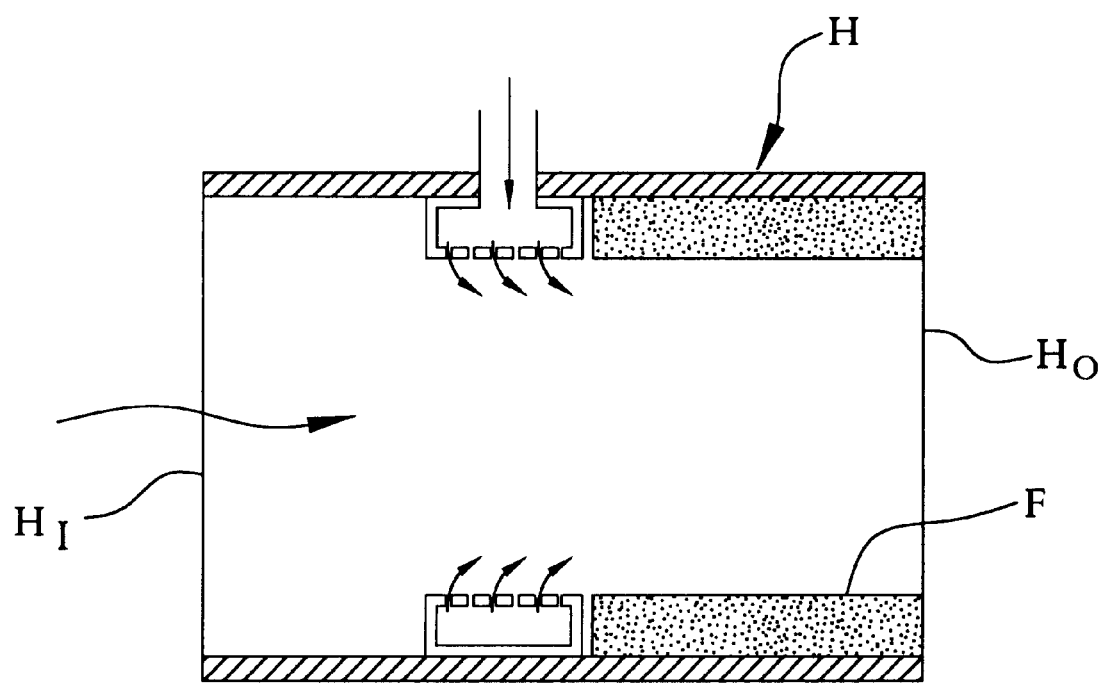
FIG. 1 is a graphical illustration of a prior art bleed air heat ejection cylinder.
Figure 2:
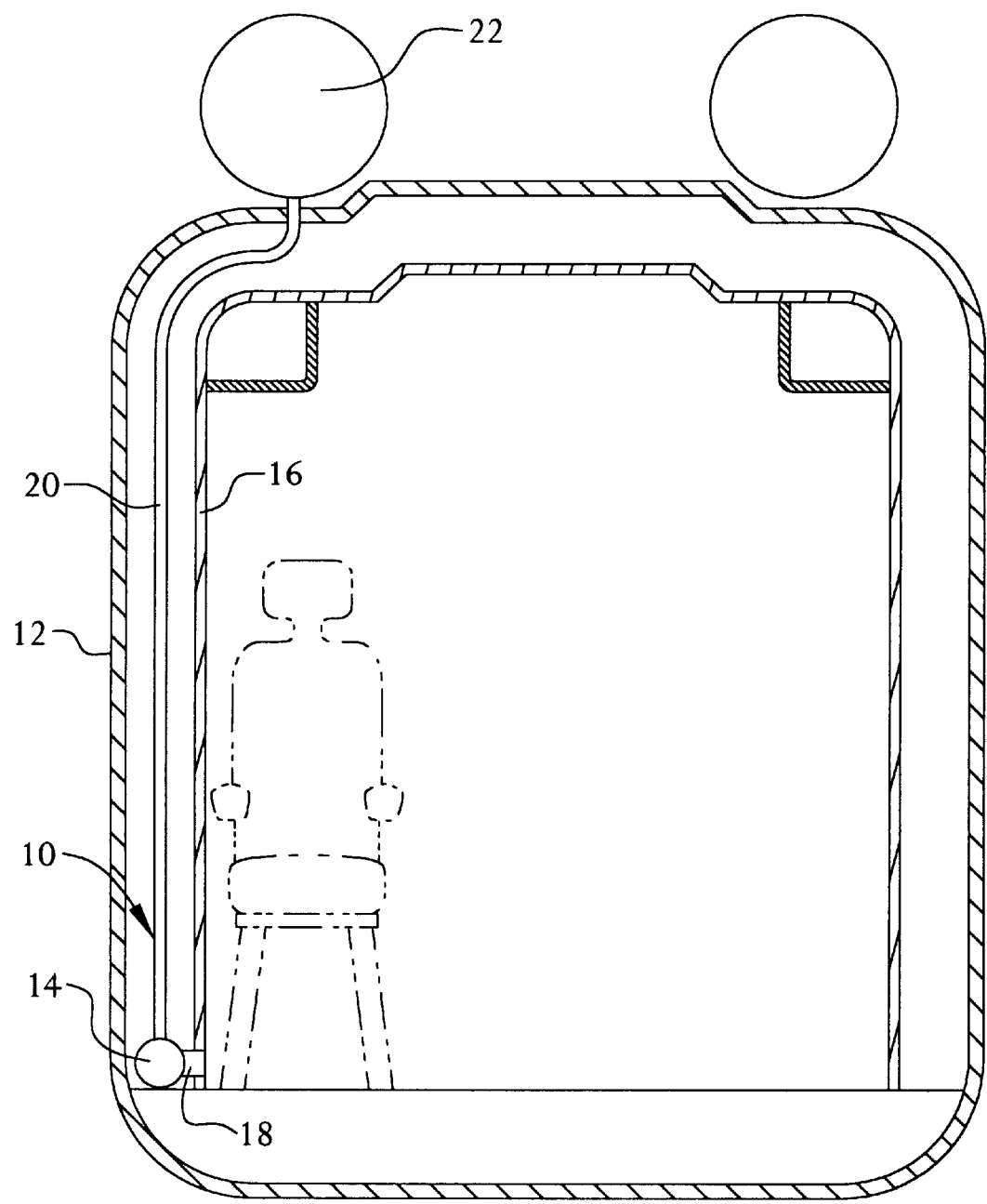
FIG. 2 is a graphical illustration of the cross-section of a helicopter cabin showing a bleed air heating system according to the present invention.

Referring now to the drawings, wherein like reference numerals illustrate corresponding or similar elements throughout the several views, FIG. 2 illustrates a cross-section of a helicopter showing a heating system 10 installation according to the present invention. The heating system 10 is mounted within the aircraft 12 and communicates with the interior of the aircraft, such as the cockpit and the cabin. The heating system 10 includes at least one heat ejection device 14 which is preferably mounted external to an interior wall structure 16 when installed in the cabin. Air is channeled to and from the heat ejection device 14 through one or more ducts 18 when the heat ejection device 14 is mounted external to an interior wall structure 16. It is also contemplated that, in certain situations, such as in the cockpit, it may be desirable to mount the heat ejection device 14 on the inside of the walls. In this configuration, ducts may not be necessary for channeling the ambient air.

A bleed air line 20 is connected to the heat ejection cylinder 14 and communicates with a high pressure bleed air heat source 22 in the aircraft. In the illustrated embodiment, the heat source 22 is an aircraft turbine engine. In this embodiment, the bleed air is taken from one of the later compression stages in the engine where the air is at an elevated temperature, such as 450° Fahrenheit. Since the air is also typically at an elevated pressure, a regulation device may be incorporated into the system to reduce the bleed air to a pressure of approximately 2–10 psi. Those skilled in the art are well aware of the details for supplying bleed air to a heating system and, thus, no further details are needed herein.

Figure 3:
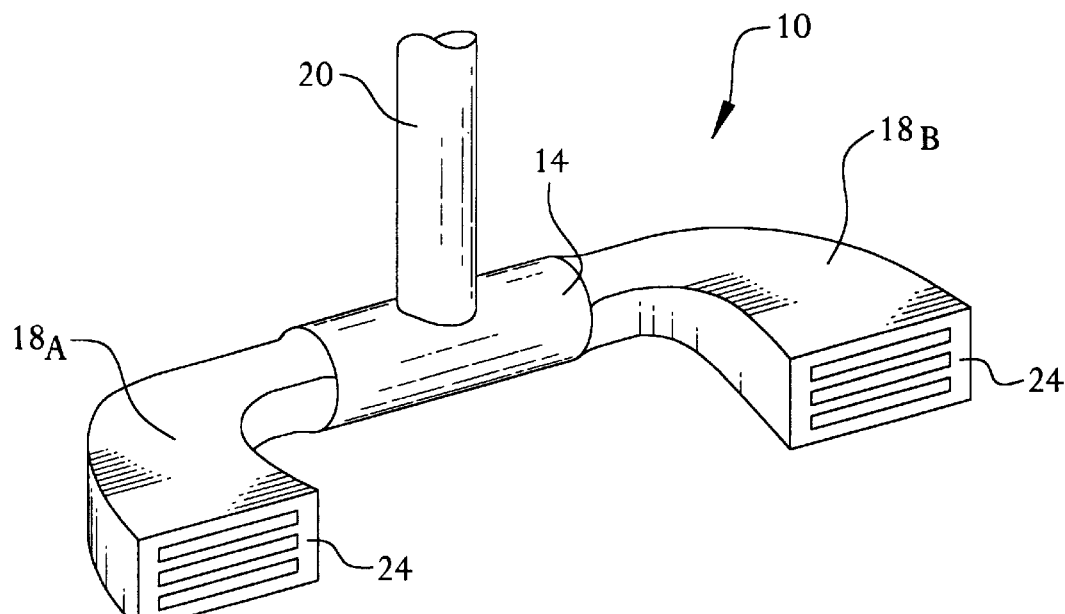
FIG. 3 is an isometric illustration of a bleed air heat ejection cylinder installation according to the present invention.

Referring now to FIG. 3, an isometric view of one embodiment of the heating system 10 as it is intended to be installed in the interior of a aircraft. The interior wall 16 is not shown in FIG. 3 for clarity. The system 10 includes an inlet duct $18_A$ and an outlet duct $18_B$. The inlet and outlet ducts $18_A$, $18_B$ preferably communicate with the interior of the aircraft compartment through vents 24. The inlet and outlet ducts $18_A$, $18_B$ are attached to and communicate with the heat ejection device 14. More particularly, the inlet duct $18_A$ is attached to an inlet $14_I$ on the device 14 and the outlet duct $18_B$ is attached to an outlet $14_O$ on the device 14. For the sake of simplicity, the heat ejection device 14 will be referred to herein as a heat ejection cylinder 14, which is the preferred embodiment. However, the heat ejection device 14 can be constructed with any suitable shape. The heat ejection cylinder 14 includes a substantially cylindrical housing 15.

Figure 4:
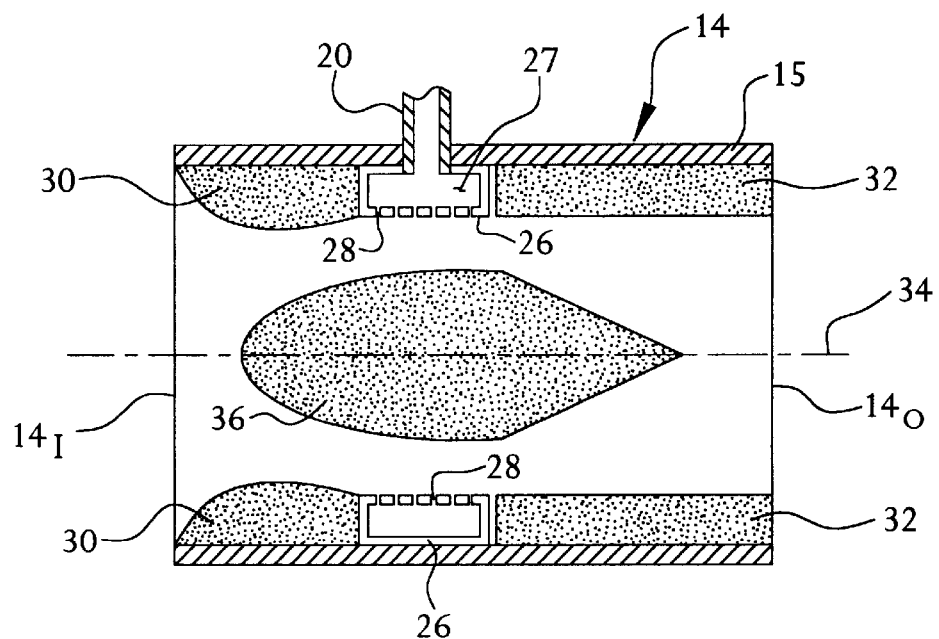
FIG. 4 is a cross-sectional illustration of a bleed air heat ejection cylinder with a noise reduction liner according to the present invention.

As shown in FIG. 4, the bleed air line 20 is connected to the heat ejection cylinder 14. A hot air dispenser 26 is mounted within the heat ejection cylinder 14 and includes an inner chamber 27 which is in fluid communication with the bleed air line 20. The hot air dispenser 26 includes at least one and, more preferably, a plurality of apertures 28 which permit bleed air from the inner chamber 27 to enter into the heat ejection cylinder 14. In a preferred embodiment., the hot air dispenser 26 is a perforated ring that extends circumferentially about a portion of the interior of the heat ejection cylinder 14. While the hot air dispenser 26 is shown as being raised off the surface of the cylinder 14, it is also contemplated that the hot air dispenser can be located within a recess in the cylinder wall.

In order to reduce the amount of noise that develops during mixing, the present invention incorporates a noise reduction liner system into the heat ejection cylinder. The noise reduction liner system includes an acoustically absorptive inlet liner 30 which is mounted to the inner surface of the heat ejection cylinder upstream from the hot air dispenser 26. The inlet liner 30 preferably has a bell mouth shape which channels the ambient air flowing into the heat ejection cylinder 14 so that it flows through the inner circumference of the dispenser 26. The inlet liner 30 reduces air flow turbulence that otherwise occurs as the air enters the heat ejection cylinder 14. The inlet liner 30 also absorbs noise that is generated by the air flows within the heat ejection cylinder 14 and which noise would otherwise radiate out from the inlet of the heat ejection cylinder 14.

The noise reduction liner system also includes a outlet liner 32 mounted to the interior surface of the heat ejection cylinder 14 downstream from the hot air dispenser 26. The outlet liner 32 preferably is annular in shape with an inner diameter that is approximately the same as the inner diameter of the hot air dispenser. The outlet liner 32 absorbs noise that is generated by the air flows within the cylinder and which noise would otherwise radiate out from the outlet of the cylinder 14. It should be readily apparent that the outlet liner 32 can have any shape that is suitable for reducing and/or absorbing noise and, thus, is not limited to an annular shape.

The inlet and outlet acoustic liners 30, 32 help reduce the noise that is generated within the heat ejection cylinder 14 due to the interaction of the airflows. However, another source of noise develops from the velocity difference between the inflowing ambient air and the inflowing bleed air. As discussed above, the pressure of the bleed air is reduced to between 2–10 psi by a regulation system. This is the lowest pressure that can realistically be used while still permitting a sufficient flow of hot air into the system. The pressurized bleed air is channeled into the heat injection cylinder 14 through the hot air dispenser 26 and mixes with the low velocity ambient air flowing into the heat ejection cylinder 14 from the inlet. The difference in velocity results in noise within the cylinder.

Figure 5:
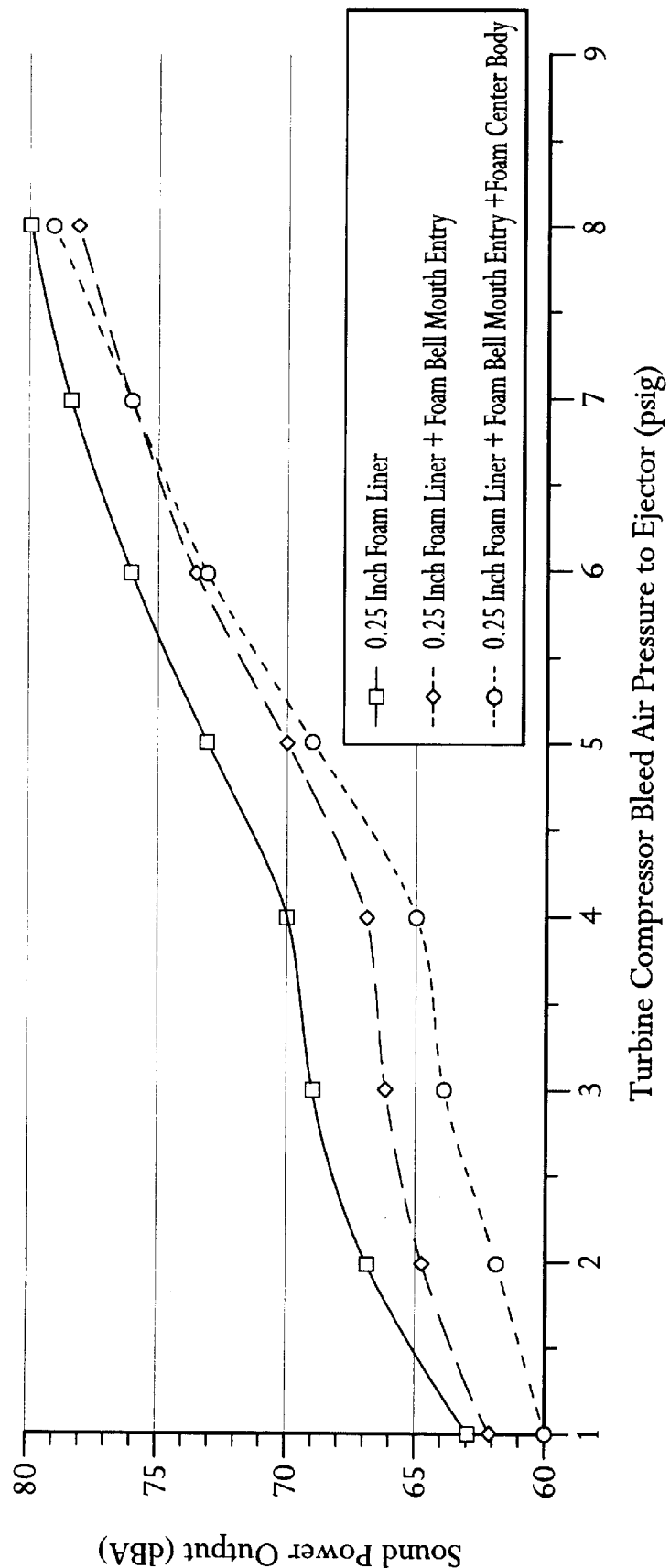
FIG. 5 is a graphical plot of noise generated by the bleed air heat ejection system with, and without, the present invention installed.

In order to reduce this velocity differential induced noise, one embodiment of the invention includes an acoustically absorptive center body 36 that is located approximately on the longitudinal or center axis 34 of the bleed air ejection cylinder 14. The acoustically absorptive center body 36 is configured to accelerate the entrained inflowing ambient air to bring its velocity closer to that of the high pressure air being ejected from the hot air dispenser 26. The increase in velocity of the inflowing ambient air reduces the noise generated from the mixing action of high pressure bleed air and entrained in-flow air. This is shown in the graph in FIG. 5 which compares the results of tests conducted on a heat ejector with and without the soundproofing of the present invention.

The acoustically absorptive center body 36 provides the additional benefit of absorbing noise radiated from the high pressure turbine bleed air as it enters the cylinder 14 through the hot air dispenser 26. The center body 36 is preferably designed with a tapered downstream end to reduce turbulence at the outlet end of the cylinder, thus reducing turbulent flow generated noise. Those skilled in the art would be readily capable of adjusting the dimensional parameters of center body, including its diameter, center body length, center body shape, as well as the bell mouth diameter to provide the required mix or dilution rate of entrained air to high pressure bleed air.

In one configuration of the invention, the absorptive center body is shaped as a tear drop with its rounded end facing the inlet and its conical tapered end toward the outlet end of the cylinder 14. Alternatively, the absorptive center body may be shaped as a symmetric cylinder with both ends rounded or with both ends having a conical taper.

Figure 6:
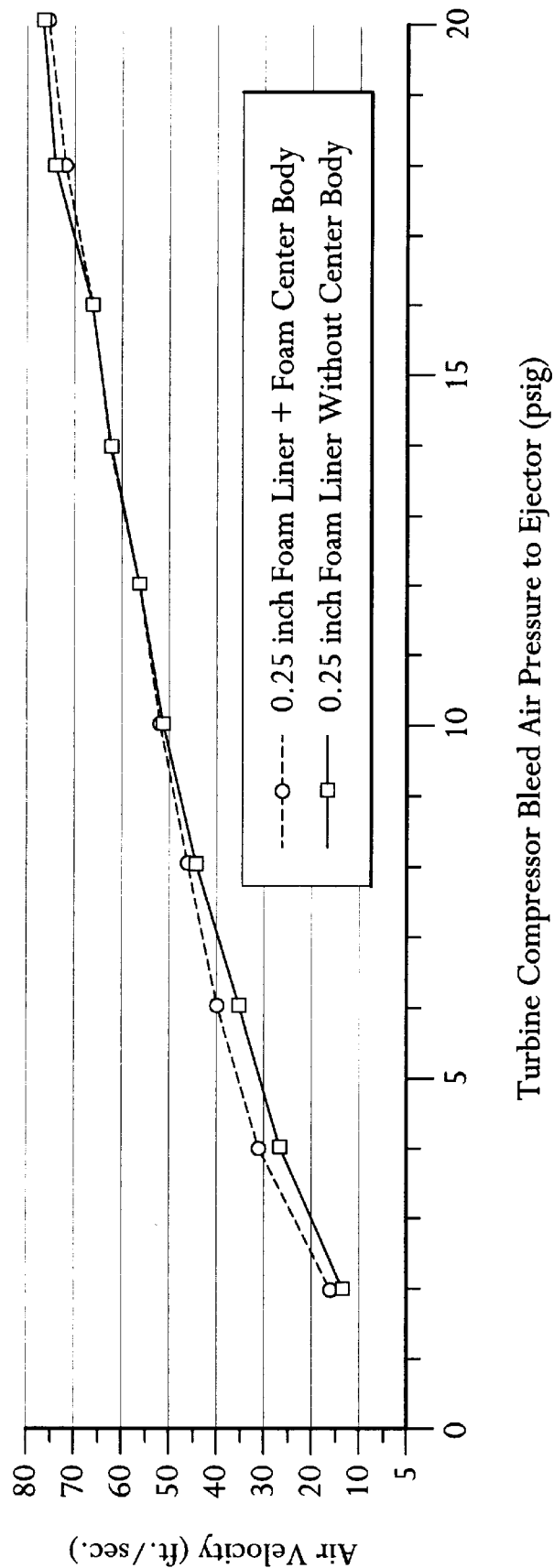
FIG. 6 is a graphical plot of the mixed air exhaust exhaust velocity of the bleed air heat ejection system with, and without, the present invention installed.

The acoustically absorptive center body 36 provides the additional benefit of reducing air flow turbulence within the heat ejector housing, thus improving the exit velocity of mixed air as illustrated in FIG. 6. By improving the exit air velocity, the present invention also improves the overall mixing action of the heat ejector.

The absorptive center body 36 can be mounted to the heat ejection cylinder 14 through any conventional means such as by a longitudinally extending rod which is mounted to the cylinder 14. The absorptive center body 36 may include a center core for structural support.

The inlet liner 30, outlet liner 32 and the center body 36 are preferably made from open cell polyurethane or polyimide foam, or fiberglass. The open cell is preferred since it is very good at attenuating noise. It is also contemplated that the liners and center body can be made from NOMEX® needlefelt material, sold by Tex-Tech Industries, Inc., Portland, Me. (NOMEX is a registered trademark of E. I. du Pont De Nemours and Company, Inc., Wilmington Del. for synthetic man-made fibers.)

It is also contemplated that the absorptive inlet liner, outlet liner and/or center body may be covered with a plastic film vapor barrier or mesh screen material to protect the components from breaking down due to moisture buildup.

While the above discussion has described the heat ejection device as being cylindrical in shape, alternate shapes are contemplated and well within the purview of the claims. Also, the invention is not limited to application as a cabin or cockpit heater in an aircraft. On the contrary, the present invention can be used as a window defroster or heater in any system which can provide a supply pressurized bleed air and a flow of ambient air.

The present invention provides a novel device for reducing the generation of noise within a bleed air supply type heating system while improving the system's efficiency by increasing the speed of inflowing air.

Although the invention has been described and illustrated with respect to the exemplary embodiments thereof, it should be understood by those skilled in the art that the foregoing and various other changes, omissions and additions may be made therein and thereto, without departing from the spirit and scope of the present invention.

What is claimed is:

1. A heat ejection device for a heating system in a vehicle, the heating system including a bleed line for channeling heated air from a heat source, an inlet duct for channeling a flow of ambient air from an interior of the vehicle, and an outlet duct for channeling mixed ambient and heated air to the interior of the vehicle, the heat ejection device comprising:

a housing having an inlet and an outlet, the inlet adapted to channel ambient air into the housing, the outlet adapted to channel mixed heated and ambient air out of the housing, the housing defining an inner passage;

a dispenser located in the housing between the housing inlet and outlet, the dispenser including an inner chamber which is adapted to receive heated air from a bleed line, the dispenser having a plurality of apertures formed in it which permit air to flow from the inner chamber into the inner passage for mixing with ambient air to form a flow of mixed air;

an acoustically absorptive inlet liner mounted on an inner surface of the housing at the housing inlet, the absorptive inlet liner adapted to direct ambient air past the dispenser and to minimize turbulence and absorb noise; and an acoustically absorptive outlet liner mounted on the inner surface of the housing downstream from the dispenser, the absorptive outlet liner adapted to absorb noise generated within the heat ejection device caused by the mixing of the ambient and bleed air flows.

2. The heating system according to claim 1 wherein the heat ejection device is a heat ejection cylinder with a substantially cylindrical housing.

3. The heating system according to claim 1 wherein the absorptive inlet and outlet liners are made from open cell foam.

4. The heating system according to claim 3 wherein the open cell foam is selected from a group consisting of polyurethane and polyimide.

5. The heating system according to claim 2 wherein the inlet liner and outlet liner are made from material selected from a group consisting of open cell polyurethane foam, open cell polyimide foam, fiberglass and needlefelt material.

6. The heating system according to claim 1 wherein the absorptive inlet liner has a bell mouth shape to direct flow along the inner passage.

7. The heating system according to claim 1 wherein the dispenser has a ring shape and wherein the apertures are formed substantially around the entire ring.

8. The heating system according to claim 1 further comprising an acoustically absorptive body mounted within the inner passage substantially along a longitudinal axis of the inner passage, the absorptive body adapted to accelerate inflowing ambient air to reduce noise caused by the mixing of the bleed air and ambient air flows.

9. The heating system according to claim 8 wherein the absorptive body includes a tapered downstream end to reduce turbulence.

10. The heating system according to claim 8 wherein the absorptive body is teardrop shaped with its rounded end facing the inlet and its conical end tapering toward the outlet.

11. A heating system for an aircraft that includes a turbine engine. the system comprising:

a bleed line attached to a heat source in the aircraft for channeling heated air from the heat source;

an inlet duct for channeling a flow of ambient air from an aircraft interior;

a heat ejection device mounted in the aircraft and attached to the bleed line, the heat ejection device adapted to mix a flow of ambient air with a flow of bleed air, the heat ejection device including a housing having an inlet and an outlet, the inlet being attached to the inlet duct and adapted to receive a flow of ambient air from the aircraft interior, the housing defining an inner passage, a dispenser located in the housing between the housing inlet and outlet, the dispenser including an inner chamber which is in fluid communication with bleed line, the dispenser having a plurality of apertures formed in it which permit air to flow from the inner chamber into the inner passage for mixing with ambient air to form a flow of mixed air, an acoustically absorptive inlet liner mounted on an inner surface of the housing at the housing inlet, the absorptive inlet liner adapted to direct ambient air past the dispenser to minimize turbulence and absorb noise, and an acoustically absorptive outlet liner mounted on the inner surface of the housing downstream from the dispenser the absorptive outlet liner adapted to absorb noise generated within the heat ejection device due to the mixing of the ambient and bleed air flows; and an outlet duct for channeling a flow of mixed air from the outlet of the heat ejection device to an aircraft interior.

12. The heating system according to claim 11 wherein the heat ejection device is a heat ejection cylinder with a substantially cylindrical housing.

13. The heating system according to claim 12 wherein the absorptive inlet liner is made from open cell foam.

14. The heating system according to claim 13 wherein the open cell foam is selected from a group consisting of polyurethane and polyimide.

15. The heating system according to claim 13 wherein the absorptive outlet liner is made from open cell foam.

16. The heating system according to claim 15 wherein the open cell foam is selected from a group consisting of polyurethane and polyimide.

17. The heating system according to claim 12 wherein the inlet liner and outlet liner are made from material selected from a group consisting of open cell polyurethane foam, open cell polyimide foam, fiberglass and needlefelt material.

18. The heating system according to claim 11 wherein the absorptive inlet liner has a bell mouth shape to direct flow along the inner passage.

19. The heating system according to claim 11 wherein the dispenser has a ring shape and wherein the apertures are formed around the entire ring.

20. The heating system according to claim 11 further comprising an acoustically absorptive body mounted within the inner passage substantially along a longitudinal axis of the inner passage, the absorptive body adapted to accelerate inflowing ambient air to reduce noise caused by the mixing of the bleed air and ambient air flows.

21. The heating system according to claim 20 wherein the absorptive body includes a tapered downstream end to reduce turbulence.

22. The heating system according to claim 20 wherein the absorptive body is teardrop shaped with its rounded end facing the inlet and its conical end tapering toward the outlet.

* * * * *